United States Patent
Su et al.

(10) Patent No.: US 8,266,574 B2
(45) Date of Patent: Sep. 11, 2012

(54) METHOD OF OPTIMIZING PARAMETERS OF ELECTRONIC COMPONENTS ON PRINTED CIRCUIT BOARDS

(75) Inventors: Hsiao-Yun Su, Tu-Cheng (TW); Ying-Tso Lai, Tu-Cheng (TW); Cheng-Hsien Lee, Tu-Cheng (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/094,807

(22) Filed: Apr. 26, 2011

(65) Prior Publication Data
US 2012/0110540 A1      May 3, 2012

(30) Foreign Application Priority Data
Nov. 1, 2010   (TW) ................................ 99137390 A

(51) Int. Cl.
G06F 17/50 (2006.01)
(52) U.S. Cl. ........................................ 716/137; 716/100
(58) Field of Classification Search .................. 716/100, 716/136–138
See application file for complete search history.

(56) References Cited

U.S. PATENT DOCUMENTS 7,490,309 B1 * 2/2009 Kukal et al. .................... 716/132
2008/0288908 A1 * 11/2008 Hart et al. ........................ 716/15

* cited by examiner

Primary Examiner — Jack Chiang
Assistant Examiner — Binh Tat
(74) Attorney, Agent, or Firm — Altis Law Group, Inc.

(57) ABSTRACT

In a method of optimizing parameters of electronic components on printed circuit boards (PCBs), a first experiment table for m variables of one type of parameter of P electronic components on a PCB is designed using n values of each variable and the RSM. P EHs of each first experiment are obtained by simulating, and P EH empirical formulas are computed according to the P EHs. A second experiment table for the m variables is designed using n' values of each variable and the full factorial design, and P EHs of each second experiment are computed using the P EH empirical formulas. Experiments, all the P EHs of which are greater than 1, are filtered from the second experiment tables, and an average EH of each filtered experiment is computed to pick an experiment the average EH of which is the greatest. The values of the m variables in the picked experiment are considered as optimized.

8 Claims, 10 Drawing Sheets

| n values of m variables | | | | |
|---|---|---|---|---|
| Variables | A | B | C | D |
| 1 | 3000 | 650 | 1300 | 500 |
| 0 | 2500 | 550 | 1100 | 400 |
| -1 | 2000 | 450 | 900 | 300 |

| | A | B | C | D |
|---|---|---|---|---|
| 01 | -1 | -1 | -1 | -1 |
| 02 | 1 | -1 | -1 | -1 |
| 03 | -1 | 1 | -1 | -1 |
| 04 | 1 | 1 | -1 | -1 |
| 05 | -1 | -1 | 1 | -1 |
| 06 | 1 | -1 | 1 | -1 |
| 07 | -1 | 1 | 1 | -1 |
| 08 | 1 | 1 | 1 | -1 |
| 09 | -1 | -1 | -1 | 1 |
| 10 | 1 | -1 | -1 | 1 |
| 11 | -1 | 1 | -1 | 1 |
| 12 | 1 | 1 | -1 | 1 |
| 13 | -1 | -1 | 1 | 1 |
| 14 | 1 | -1 | 1 | 1 |
| 15 | -1 | 1 | 1 | 1 |
| 16 | 1 | 1 | 1 | 1 |
| 17 | -1 | 0 | 0 | 0 |
| 18 | 1 | 0 | 0 | 0 |
| 19 | 0 | -1 | 0 | 0 |
| 20 | 0 | 1 | 0 | 0 |
| 21 | 0 | 0 | -1 | 0 |
| 22 | 0 | 0 | 1 | 0 |
| 23 | 0 | 0 | 0 | -1 |
| 24 | 0 | 0 | 0 | 1 |
| 25 | 0 | 0 | 0 | 0 |

|    | A  | B  | C  | D  | EH0    | EH1    | EH2    | EH3 | EH4    | EH5   | EH6   | EH7    | EH8    |
|----|----|----|----|----|--------|--------|--------|-----|--------|-------|-------|--------|--------|
| 01 | -1 | -1 | -1 | -1 | 1.001  | 1.082  | 0.9721 |     | 1.068  | 1.074 | 1.06  | 1.054  | 1.055  |
| 02 | 1  | -1 | -1 | -1 | 0.9941 | 1.085  | 0.9643 |     | 1.064  | 1.075 | 1.069 | 1.053  | 1.043  |
| 03 | -1 | 1  | -1 | -1 | 1.052  | 1.036  | 1.066  |     | 1.055  | 1.069 | 1.057 | 1.035  | 1.044  |
| 04 | 1  | 1  | -1 | -1 | 1.026  | 0.9972 | 1.067  |     | 1.055  | 1.069 | 1.065 | 1.047  | 1.04   |
| 05 | -1 | -1 | 1  | -1 | 0.9253 | 0.9462 | 0.9187 |     | 1.071  | 1.059 | 1.052 | 1.049  | 1.044  |
| 06 | 1  | -1 | 1  | -1 | 0.9746 | 0.9562 | 0.9307 |     | 1.068  | 1.068 | 1.071 | 1.042  | 1.041  |
| 07 | -1 | 1  | 1  | -1 | 0.9269 | 0.933  | 1.076  |     | 0.9439 | 1.068 | 1.049 | 1.04   | 1.038  |
| 08 | 1  | 1  | 1  | -1 | 0.9776 | 0.979  | 1.074  |     | 0.9844 | 1.068 | 1.053 | 1.051  | 1.041  |
| 09 | -1 | -1 | -1 | 1  | 1.002  | 1.081  | 0.9728 |     | 1.07   | 1.075 | 1.061 | 1.055  | 1.057  |
| 10 | 1  | -1 | -1 | 1  | 0.9948 | 1.086  | 0.9645 |     | 1.064  | 1.076 | 1.071 | 1.054  | 1.043  |
| 11 | -1 | 1  | -1 | 1  | 1.041  | 1.035  | 1.064  |     | 1.051  | 1.062 | 1.058 | 1.037  | 1.045  |
| 12 | 1  | 1  | -1 | 1  | 1.027  | 0.9978 | 1.068  |     | 1.055  | 1.071 | 1.065 | 1.048  | 1.04   |
| 13 | -1 | -1 | 1  | 1  | 0.9257 | 0.9461 | 0.9189 |     | 1.07   | 1.06  | 1.054 | 1.05   | 1.045  |
| 14 | 1  | -1 | 1  | 1  | 0.9748 | 0.9562 | 0.9092 |     | 1.068  | 1.069 | 1.073 | 1.042  | 1.042  |
| 15 | -1 | 1  | 1  | 1  | 0.9266 | 0.9337 | 1.076  |     | 0.9443 | 1.069 | 1.049 | 1.04   | 1.039  |
| 16 | 1  | 1  | 1  | 1  | 0.9788 | 0.9806 | 1.077  |     | 0.9637 | 1.068 | 1.054 | 1.051  | 1.041  |
| 17 | -1 | 0  | 0  | 0  | 1.002  | 0.9991 | 0.9874 |     | 1.065  | 1.059 | 1.058 | 1.042  | 1.051  |
| 18 | 1  | 0  | 0  | 0  | 1.016  | 1.014  | 0.9856 |     | 1.072  | 1.051 | 1.059 | 1.049  | 1.04   |
| 19 | 0  | -1 | 0  | 0  | 0.8812 | 0.9445 | 0.8758 |     | 1.003  | 1.002 | 1.001 | 0.999  | 0.9765 |
| 20 | 0  | 1  | 0  | 0  | 0.8493 | 0.9297 | 1.007  |     | 0.9177 | 1.024 | 1.022 | 0.9982 | 0.9971 |
| 21 | 0  | 0  | -1 | 0  | 0.8832 | 0.9018 | 0.8559 |     | 1.026  | 1.025 | 1.023 | 1.021  | 0.9986 |
| 22 | 0  | 0  | 1  | 0  | 0.8049 | 0.8857 | 0.9411 |     | 0.9608 | 1.002 | 1.002 | 0.9964 | 0.9971 |
| 23 | 0  | 0  | 0  | -1 | 0.8975 | 0.9286 | 0.869  |     | 1.026  | 1.026 | 1.023 | 0.9988 | 0.9974 |
| 24 | 0  | 0  | 0  | 1  | 0.8975 | 0.9294 | 0.8692 |     | 1.025  | 1.027 | 1.023 | 0.9989 | 0.9977 |
| 25 | 0  | 0  | 0  | 0  | 0.8979 | 0.9283 | 0.8692 |     | 1.026  | 1.026 | 1.023 | 0.9988 | 0.9974 |

FIG. 5

Model formula: $EH = b_0$
$+ b_1 \times A + b_2 \times B + b_3 \times C + b_4 \times D$
$+ b_5 \times (A^2) + b_6 \times (B^2) + ...$
$+ b_m (A \times B) + b_{m+1} (A \times C) + ... + e$

FIG. 6(A)

| coefficient | EH0 | EH1 | EH2 | EH3 | EH4 | EH5 | EH6 | EH7 | EH8 |
|---|---|---|---|---|---|---|---|---|---|
| $b_0$ | 0.902702 | 0.924222 | 0.879498 | 0.902431 | 1.01727 | 1.02112 | 1.02046 | 1.00002 | 0.99636 |
| $b_1$ | 0.008667 | 0.002828 | -0.00064 | -0.00188 | 0.00422 | 0.00167 | 0.00511 | 0.00194 | -0.00261 |
| $b_2$ | 0.013161 | -0.01623 | 0.063778 | -0.0121 | -0.03311 | 0 | -0.00111 | -0.00282 | -0.00119 |
| $b_3$ | -0.02782 | -0.04301 | -0.00406 | -0.04209 | -0.02522 | -0.00306 | -0.00289 | -0.00226 | -0.00208 |
| $b_4$ | -0.00031 | 0.000311 | -0.00101 | -0.00144 | -0.00241 | 0.00061 | 0.0005 | 0.00034 | 0.00035 |
| $b_5$ | 0.100697 | 0.082787 | 0.094989 | 0.090599 | 0.06142 | 0.03957 | 0.04599 | 0.04407 | 0.050353 |
| $b_6$ | 0.006947 | 0.018337 | 0.049889 | 0.014949 | -0.04673 | -0.00243 | -0.00601 | -0.00283 | -0.00835 |
| $b_7$ | -0.01425 | -0.03501 | 0.006989 | -0.0042 | -0.01368 | -0.00193 | -0.00501 | 0.00827 | 0.002703 |
| $b_8$ | -0.0108 | 0.010237 | -0.02241 | -0.0024 | 0.01892 | 0.01107 | 0.00549 | -0.00258 | 0.002403 |
| $b_9$ | -0.00166 | -0.00189 | 0.001112 | 0.004613 | 0.00368 | -0.00013 | -0.00081 | 0.00387 | 0.00175 |
| $b_{10}$ | 0.015638 | 0.0125 | 0.000775 | 0.007087 | 0.00256 | -0.00025 | 0.00206 | -0.00088 | 0.002125 |
| $b_{11}$ | 0.000737 | 0.000225 | -0.00101 | 0.001375 | -0.00238 | -0.00012 | 0.00006 | -0.00012 | -0.00025 |
| $b_{12}$ | -0.00871 | 0.018787 | 0.014638 | 0.010163 | -0.02317 | 0.0035 | -0.00056 | 0.003 | 0.001 |
| $b_{13}$ | -0.00064 | 0.000063 | 0.0014 | -0.00073 | -0.00033 | 0.00013 | -0.00031 | 0 | -0.00013 |
| $b_{14}$ | 0.000687 | 0.000225 | -0.00114 | 0.001975 | 0.00004 | -0.00025 | 0.00006 | -0.00025 | 0 |

FIG. 6(B)

| n' values of the m variables | | | | |
|---|---|---|---|---|
| Variables | A | B | C | D |
| 1 | 3000 | 650 | 1300 | 500 |
| 0.5 | 2750 | 600 | 1200 | 450 |
| 0 | 2500 | 550 | 1100 | 400 |
| -0.5 | 2250 | 500 | 1000 | 350 |
| -1 | 2000 | 450 | 900 | 300 |

FIG. 7(A)

| | A | B | C | D |
|---|---|---|---|---|
| 001 | 1 | 1 | 1 | -1 |
| 002 | 1 | 1 | 1 | 1 |
| 003 | 1 | 1 | 1 | -0.5 |
| 004 | 1 | 1 | 1 | 0.5 |
| 005 | 1 | 1 | 1 | 0 |
| 006 | 1 | 1 | 0.5 | -1 |
| 007 | 1 | 1 | 0.5 | 1 |
| 008 | 1 | 1 | 0.5 | -0.5 |
| 009 | 1 | 1 | 0.5 | 0.5 |
| 010 | 1 | 1 | 0.5 | 0 |
| 011 | 1 | 1 | 0 | -1 |
| 012 | 1 | 1 | 0 | -0.5 |
| ... | ... | ... | ... | ... |
| 618 | -1 | -1 | -0.5 | -0.5 |
| 619 | -1 | -1 | -0.5 | 0.5 |
| 620 | -1 | -1 | -0.5 | 0 |
| 621 | -1 | -1 | -1 | -1 |
| 622 | -1 | -1 | -1 | 1 |
| 623 | -1 | -1 | -1 | -0.5 |
| 624 | -1 | -1 | -1 | 0.5 |
| 625 | -1 | -1 | -1 | 0 |

FIG. 7(B)

| | A | B | C | D | EH0 | EH1 | EH2 | EH3 | EH4 | EH5 | EH6 | EH7 | EH8 |
|---|---|---|---|---|---|---|---|---|---|---|---|---|---|
| 001 | 1 | 1 | 1 | -1 | 0.9841 | 1.0021 | 1.0357 | 0.9912 | 1.0175 | 1.0819 | 1.0767 | 1.0658 | 1.0588 |
| 002 | 1 | 1 | 1 | 1 | 0.9850 | 1.0038 | 1.0322 | 0.9936 | 1.0074 | 1.0827 | 1.0773 | 1.0658 | 1.0588 |
| 003 | 1 | 1 | 1 | -0.5 | 0.9924 | 0.9849 | 1.0516 | 0.9836 | 1.0018 | 1.0738 | 1.0727 | 1.0677 | 1.0560 |
| 004 | 1 | 1 | 1 | 0.5 | 0.9929 | 0.9957 | 1.0499 | 0.9949 | 0.9957 | 1.0742 | 1.0730 | 1.0677 | 1.0550 |
| 005 | 1 | 1 | 1 | 0 | 0.9954 | 0.9927 | 1.0564 | 0.9948 | 0.9935 | 1.0712 | 1.0715 | 1.0684 | 1.0544 |
| 006 | 1 | 1 | 0.5 | -1 | 1.0056 | 1.0344 | 1.0242 | 1.0079 | 1.0597 | 1.0831 | 1.0812 | 1.0598 | 1.0543 |
| 007 | 1 | 1 | 0.5 | 1 | 1.0058 | 1.0358 | 1.0218 | 1.0082 | 1.0495 | 1.0841 | 1.0817 | 1.0597 | 1.0542 |
| 008 | 1 | 1 | 0.5 | -0.5 | 1.0137 | 1.0270 | 1.0404 | 1.0097 | 1.0340 | 1.0751 | 1.0772 | 1.0615 | 1.0525 |
| 009 | 1 | 1 | 0.5 | 0.5 | 1.0139 | 1.0278 | 1.0392 | 1.0099 | 1.0299 | 1.0756 | 1.0775 | 1.0616 | 1.0525 |
| 010 | 1 | 1 | 0.5 | 0 | 1.0165 | 1.0248 | 1.0464 | 1.0104 | 1.0257 | 1.0726 | 1.0760 | 1.0622 | 1.0519 |
| 011 | 1 | 1 | 0 | -1 | 1.0199 | 1.0491 | 1.0162 | 1.0223 | 1.0771 | 1.0834 | 1.0831 | 1.0574 | 1.0531 |
| 012 | 1 | 1 | 0 | -0.5 | 1.0279 | 1.0417 | 1.0327 | 1.0237 | 1.0603 | 1.0754 | 1.0791 | 1.0595 | 1.0513 |
| ⋮ | | | | | | | | | | | | | |
| 618 | -1 | -1 | -0.5 | -0.5 | 0.9983 | 1.0365 | 1.0193 | 1.0309 | 1.0217 | 1.0464 | 1.0433 | 1.0333 | 1.0331 |
| 619 | -1 | -1 | -0.5 | 0.5 | 0.9976 | 1.0384 | 1.0184 | 1.0278 | 1.0220 | 1.0491 | 1.0440 | 1.0339 | 1.0338 |
| 620 | -1 | -1 | -0.5 | 0 | 1.0007 | 1.0359 | 1.0246 | 1.0299 | 1.0171 | 1.0460 | 1.0423 | 1.0343 | 1.0328 |
| 621 | -1 | -1 | -1 | -1 | 0.9976 | 1.0572 | 1.0173 | 1.0581 | 1.0276 | 1.0579 | 1.0455 | 1.0394 | 1.0392 |
| 622 | -1 | -1 | -1 | 1 | 0.9954 | 1.0568 | 1.0168 | 1.0500 | 1.0284 | 1.0596 | 1.0469 | 1.0408 | 1.0406 |
| 623 | -1 | -1 | -1 | -0.5 | 1.0052 | 1.0494 | 1.0340 | 1.0579 | 1.0138 | 1.0500 | 1.0418 | 1.0417 | 1.0377 |
| 624 | -1 | -1 | -1 | 0.5 | 1.0041 | 1.0492 | 1.0337 | 1.0536 | 1.0140 | 1.0509 | 1.0425 | 1.0424 | 1.0384 |
| 625 | -1 | -1 | -1 | 0 | 1.0073 | 1.0468 | 1.0394 | 1.0555 | 1.0092 | 1.0477 | 1.0407 | 1.0427 | 1.0375 |

FIG. 8

|     | EH0    | EH1    | EH2    | EH3    | EH4    | EH5    | EH6    | EH7    | EH8    | Status |
|-----|--------|--------|--------|--------|--------|--------|--------|--------|--------|--------|
| 001 | 0.9841 | 1.0021 | 1.0357 | 0.9912 | 1.0175 | 1.0819 | 1.0767 | 1.0658 | 1.0568 | Fail   |
| 002 | 0.9850 | 1.0038 | 1.0322 | 0.9936 | 1.0074 | 1.0827 | 1.0773 | 1.0658 | 1.0568 | Fail   |
| 003 | 0.9924 | 0.9949 | 1.0516 | 0.9936 | 1.0008 | 1.0738 | 1.0727 | 1.0677 | 1.0550 | Fail   |
| 004 | 0.9929 | 0.9957 | 1.0499 | 0.9948 | 0.9957 | 1.0742 | 1.0730 | 1.0677 | 1.0550 | Fail   |
| 005 | 0.9954 | 0.9827 | 1.0564 | 0.9948 | 0.9935 | 1.0712 | 1.0715 | 1.0684 | 1.0544 | Fail   |
| 006 | 1.0056 | 1.0344 | 1.0242 | 1.0078 | 1.0507 | 1.0831 | 1.0812 | 1.0596 | 1.0543 | PASS   |
| 007 | 1.0058 | 1.0358 | 1.0218 | 1.0082 | 1.0405 | 1.0841 | 1.0817 | 1.0597 | 1.0542 | PASS   |
| 008 | 1.0137 | 1.0270 | 1.0404 | 1.0097 | 1.0340 | 1.0751 | 1.0772 | 1.0615 | 1.0525 | PASS   |
| 009 | 1.0139 | 1.0278 | 1.0392 | 1.0099 | 1.0289 | 1.0756 | 1.0775 | 1.0616 | 1.0525 | PASS   |
| 010 | 1.0165 | 1.0248 | 1.0454 | 1.0104 | 1.0267 | 1.0726 | 1.0760 | 1.0622 | 1.0519 | PASS   |
| 011 | 1.0199 | 1.0491 | 1.0162 | 1.0223 | 1.0771 | 1.0834 | 1.0831 | 1.0574 | 1.0531 | PASS   |
| 012 | 1.0279 | 1.0417 | 1.0327 | 1.0237 | 1.0603 | 1.0754 | 1.0791 | 1.0595 | 1.0513 | PASS   |
| ... | ...    | ...    | ...    | ...    | ...    | ...    | ...    | ...    | ...    | ...    |
| 618 | 0.9983 | 1.0385 | 1.0193 | 1.0309 | 1.0217 | 1.0484 | 1.0433 | 1.0333 | 1.0331 | Fail   |
| 619 | 0.9976 | 1.0384 | 1.0184 | 1.0278 | 1.0220 | 1.0491 | 1.0440 | 1.0339 | 1.0338 | Fail   |
| 620 | 1.0007 | 1.0359 | 1.0245 | 1.0299 | 1.0171 | 1.0460 | 1.0423 | 1.0343 | 1.0328 | PASS   |
| 621 | 0.9976 | 1.0572 | 1.0173 | 1.0581 | 1.0278 | 1.0579 | 1.0455 | 1.0394 | 1.0392 | Fail   |
| 622 | 0.9954 | 1.0568 | 1.0168 | 1.0500 | 1.0284 | 1.0596 | 1.0469 | 1.0408 | 1.0406 | Fail   |
| 623 | 1.0052 | 1.0494 | 1.0340 | 1.0579 | 1.0138 | 1.0500 | 1.0418 | 1.0417 | 1.0377 | PASS   |
| 624 | 1.0041 | 1.0492 | 1.0337 | 1.0538 | 1.0140 | 1.0509 | 1.0425 | 1.0424 | 1.0384 | PASS   |
| 625 | 1.0073 | 1.0468 | 1.0394 | 1.0565 | 1.0092 | 1.0477 | 1.0407 | 1.0427 | 1.0375 | PASS   |

FIG. 9

| A | B | C | D | EH0 | EH1 | EH2 | EH3 | EH4 | EH5 | EH6 | EH7 | EH8 | Status | Average |
|---|---|---|---|------|------|------|------|------|------|------|------|------|--------|---------|
| -1 | 1 | -1 | -1 | 1.0450 | 1.0496 | 1.0093 | 1.0563 | 1.0938 | 1.0772 | 1.0752 | 1.0520 | 1.0602 | PASS | 1.05774 |
| -1 | 1 | -1 | 1 | 1.0412 | 1.0494 | 1.0144 | 1.0453 | 1.0930 | 1.0794 | 1.0754 | 1.0534 | 1.0612 | PASS | 1.056972 |
| -1 | 1 | -1 | -0.5 | 1.0528 | 1.0419 | 1.0274 | 1.0554 | 1.0794 | 1.0695 | 1.0711 | 1.0543 | 1.0587 | PASS | 1.056721 |
| -1 | 1 | -1 | 0.5 | 1.0505 | 1.0418 | 1.0299 | 1.0499 | 1.0790 | 1.0706 | 1.0712 | 1.0550 | 1.0591 | PASS | 1.056337 |
| -1 | 1 | -1 | 0 | 1.0544 | 1.0393 | 1.0343 | 1.0532 | 1.0745 | 1.0673 | 1.0698 | 1.0553 | 1.0583 | PASS | 1.056253 |
| 1 | 1 | -1 | -1 | 1.0272 | 1.0260 | 1.0107 | 1.0449 | 1.1093 | 1.0810 | 1.0796 | 1.0656 | 1.0548 | PASS | 1.055452 |
| 1 | 1 | -0.5 | -1 | 1.0271 | 1.0463 | 1.0117 | 1.0346 | 1.0966 | 1.0827 | 1.0826 | 1.0694 | 1.0532 | PASS | 1.054931 |
| 1 | 1 | -1 | -0.5 | 1.0349 | 1.0185 | 1.0276 | 1.0453 | 1.0925 | 1.0732 | 1.0756 | 1.0678 | 1.0529 | PASS | 1.054298 |
| 1 | 1 | -1 | 1 | 1.0254 | 1.0268 | 1.0117 | 1.0393 | 1.0989 | 1.0826 | 1.0800 | 1.0656 | 1.0547 | PASS | 1.054023 |
| 1 | 1 | -0.5 | -0.5 | 1.0350 | 1.0389 | 1.0285 | 1.0355 | 1.0798 | 1.0746 | 1.0786 | 1.0616 | 1.0514 | PASS | 1.053794 |
| 1 | 1 | -0.5 | 1 | 1.0280 | 1.0473 | 1.0116 | 1.0311 | 1.0863 | 1.0842 | 1.0831 | 1.0601 | 1.0532 | PASS | 1.053652 |
| 1 | 1 | -1 | 0 | 1.0371 | 1.0162 | 1.0336 | 1.0445 | 1.0852 | 1.0708 | 1.0743 | 1.0696 | 1.0523 | PASS | 1.053635 |

METHOD OF OPTIMIZING PARAMETERS OF ELECTRONIC COMPONENTS ON PRINTED CIRCUIT BOARDS

BACKGROUND

1. Technical Field

Embodiments of the present disclosure generally relate to design of printed circuit boards (PCB)s, and more particularly to a method of optimizing parameters, which influence signal transmission, of electronic components on PCBs.

2. Description of Related Art

Quality is an important factor in the manufacture of electronic products. It may be understood that, quality of electronic products may be determined at the design stage. A PCB is used to mechanically support and electrically connect electronic components using conductive pathways, tracks or signal traces etched from copper sheets laminated onto a non-conductive substrate. Thus, design of the PCB plays an important role in the quality of an electronic device which houses the PCB.

Parameters of electronic components on a PCB, such as lengths of wiring lines, wiring layers, and characteristic impedance of transmission lines, will influence the design of the PCB. Thus, how to optimize the parameters is important.

BRIEF DESCRIPTION OF THE DRAWINGS

FIG. 5 illustrates eye heights (EH)s of first experiments, according to embodiments of the present disclosure.

FIG. 6(A) and FIG. 6(B) respectively illustrate a predetermined model formula and coefficients of empirical formulas computed using the predetermined model formula and the EHs of FIG. 4, according to embodiments of the present disclosure.

FIG. 7(A) and FIG. 7(B) illustrate a second experiment table designed using the full factorial design, according to embodiments of the present disclosure.

FIG. 8 illustrates EHs of the second experiment table, according to embodiments of the present disclosure.

FIG. 9 illustrates filter of experiment, all the EHs of which are greater than 1, from the second experiment table, according to embodiments of the present disclosure.

FIG. 10 illustrates optimized values of the variables of the parameter of the electronic components on the PCB, according to embodiments of the present disclosure.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

As mentioned above, parameters of electronic components on a PCB 2 (shown in FIG. 2), such as lengths of wiring lines, wiring layers, and characteristic impedance of transmission lines, will influence the design of the PCB 2. Each parameter may have m variables, and each variable may have n values, where both m and n are positive integers. Such as the example illustrated in FIG. 1A and FIG. 1B, the parameters, namely the lengths of wiring lines of 9 memories D0~D8 have 4 variables A, B, C, and D, and each variable has 3 different values represented as "1", "0", and "−1". In order to disclose the method of optimizing parameters of electronic components on PCBs comprehensibly, the following paragraphs give a detailed description of optimizing the 4 variables A, B, C, and D of the lengths of wiring lines of 9 memories D0~D8 referring to FIG. 3~FIG. 10. However, it should be understood that other parameters can be analyzed in a similar method.

Figure 2:
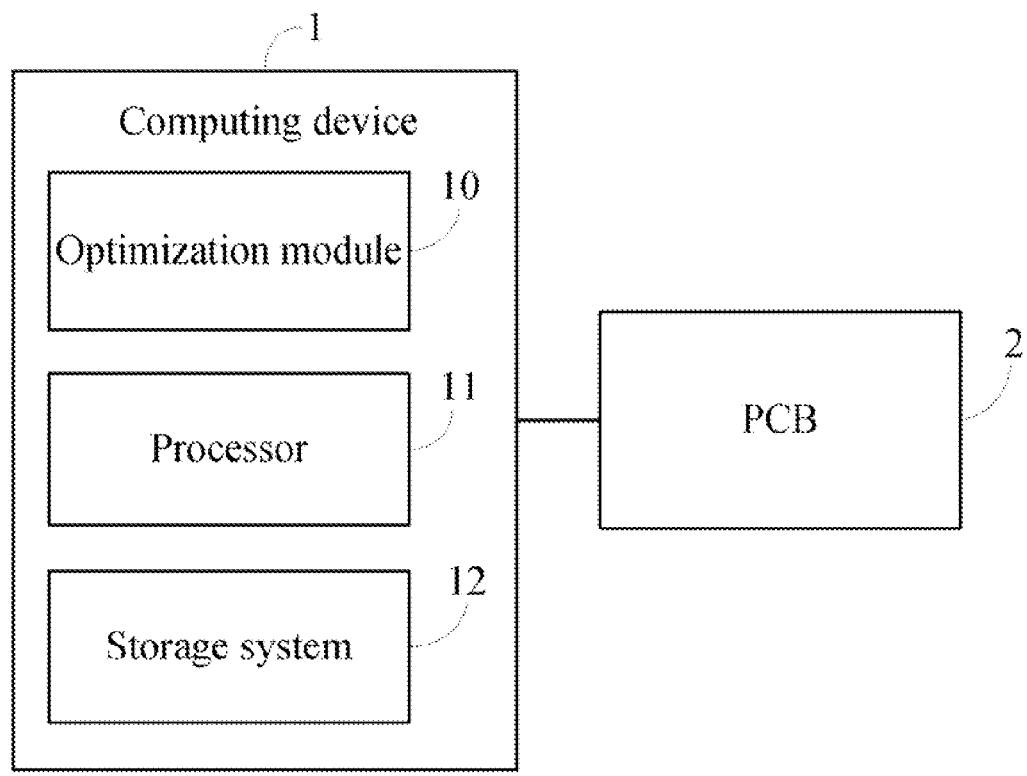
FIG. 2 is a block diagram of one embodiment of a computing device comprising a optimization module.
Figure 3:
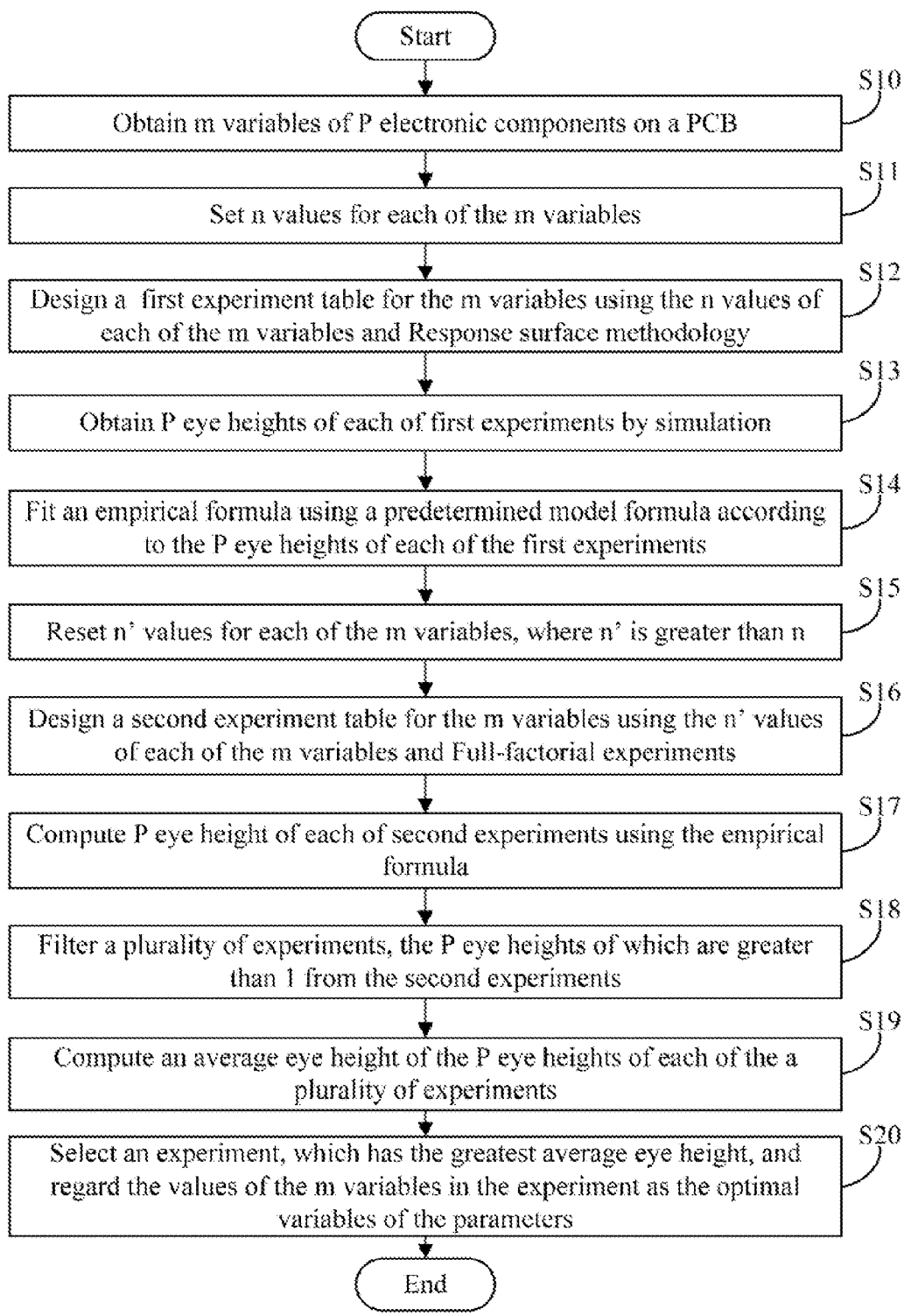
FIG. 3 is a flowchart illustrating a method of optimizing parameters of electronic components on PCBs, according to embodiments of the present disclosure.

FIG. 3 is a flowchart illustrating a method of optimizing parameters of electronic components on PCBs, according to embodiments of the present disclosure. The method is implemented by execution of computer readable program code by at least one processor of a computing device (not shown), such as a computer. Depending on the embodiment, additional blocks in the flow of FIG. 3 may be added, others removed, and the ordering of the blocks may be changed. As shown in FIG. 2, the PCB 2 is electronically connected to a computing device 1. The computer 1 includes a optimization module 10, a processor 11, and a storage system 12. It may be understood that one or more specialized or general purpose processors, such as the processor 11, may be used to execute one or more computerized codes of the optimization module 10. The one or more computerized codes of the optimization module 10 may be stored in the storage system 12. The storage system 12 may be a hard disk drive, flash memory, or other memory to store various data, such as test results, for example.

Figure 1:
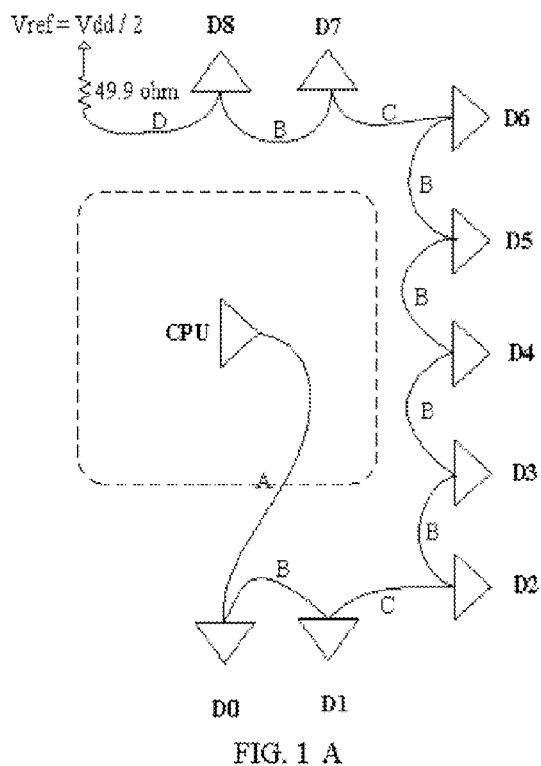
FIG. 1A and FIG. 1B illustrate variables of one parameter of electronic components on a PCB, according to embodiments of the present disclosure.

In block S10, the optimization module 10 obtains m variables of one type of parameters of P electronic components on the PCB 2, where both m and P are positive integers. Referring to FIG. 1A, in the present embodiment, m is 4, and the m variables include A, B, C, and D. P is 9, and the parameters of the P electronic components are the lengths of wiring lines of 9 memories on the PCB 2.

In block S11, the optimization module 10 sets n values for each of the m variables, where n is a positive integer. Referring to FIG. 1B, in the present embodiment, n is 3, and the n values of each of the m variables are "1", "0", and "−1". In one example, the optimization module 10 can set "3000", "2500", and "2000" as three values for the variable A, sets "650", "550", and "450" as three values for the variable B, and so on.

Figures 4A, 4B:
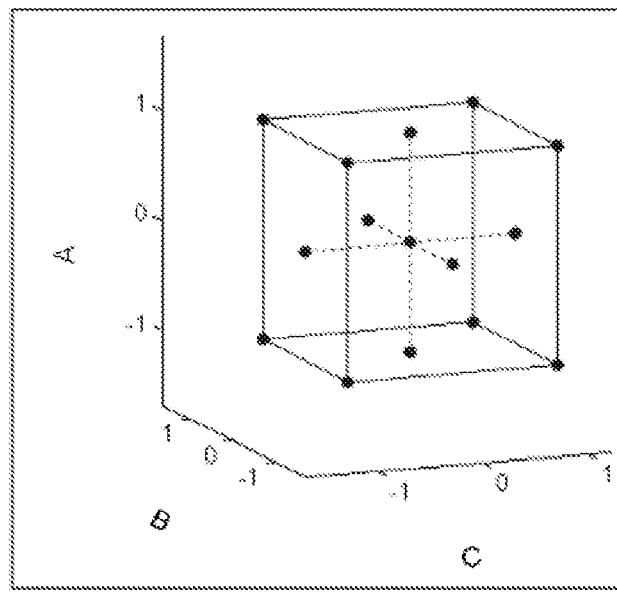
FIG. 4(A) and FIG. 4(B) gives tables to illustrate a first experiment tables designed using the Response Surface Methodology (RSM), according to embodiments of the present disclosure.

In block S12, the optimization module 10 designs a first experiment table for the m variables using the n values of each of the m variables and the Response Surface Methodology (RSM). In some embodiments, the first experiment table may include n groups of experiment data of first experiments. Referring to FIG. 4(A) and FIG. 4(B), using RSM, the optimization module 10 firstly constructs a cube whose axis are respectively any three of the m variables, and then designs the first experiment table using, for example, eight vertexes and the center point of the cube.

In block S13, referring to FIG. 5, the optimization module 10 obtains P eye heights (EH)s of each of the first experiments by simulation. It may be understood that, the P EHs are respectively EHs of a digital data signal generated by the P electronic components. For example, in the present embodiment, each EH0 in FIG. 4 is the EH of a digital data signal generated by the first memory D0 in different first experiment. In telecommunication, an eye pattern, also known as an eye diagram, is an oscilloscope display in which a digital data signal from a receiver is repetitively sampled and applied to the vertical input, while the data rate is used to trigger the horizontal sweep. It is called as eye pattern because, for several types of coding, the pattern looks like a series of eyes between a pair of rails. There are many measurements that can be obtained from an eye pattern, one of which is the eye height.

In block S14, the optimization module 10 computes P EH empirical formulas according to the P EHs obtained from each of the first experiments using a predetermined model formula and mathematical regression analysis. It may be understood that, the P EH empirical formulas are respectively used to compute EHs of the digital data signal generated by the P electronic components. Referring to FIG. 6(A), one example of the predetermined model formula is:

$$EH=b_0+b_1*A+b_2*B+b_3*C+b_4*D+b_5*A^2+b_6*B^2+b_7*C^2+\ldots+b_m*AB+b_{m+1}*AC+\ldots+e.$$

In the model formula, $b_0, b_1, \ldots b_{m+1}$, are coefficients computed by the computing device. Referring to FIG. 6(B), the P EH empirical formulas are:

$$EH1=0.902702+0.008667*A+0.013161*B-0.02782*C-0.00031*D+0.100697*A^2+0.006947*B^2-0.01425*C^2+\ldots-0.00064*AB+0.000687*AC+\ldots+e;$$

$$EH2=0.924222+0.002828*A-0.01623*B-0.04301*C+0.000311*D+0.082787*A^2+0.018337*B^2-0.03501*C^2+\ldots+0.000063*AB+0.000225*AC+\ldots+e;\text{ and so on.}$$

In block S15, referring to FIG. 7(A), the optimization module 10 resets n' values for each of the m variables, where n' is a positive integer, and n' is greater than n. In the present embodiment, the n' values of each of the m variables are represented by "1", "0.5", "0", "−0.5", and "−1". For example, the optimization module 10 sets "3000", "2750", "2500", "2250", and "2000" five values for the variable A, sets "650", "600", "550", "500", and "450" five values for the variable B, and so on.

In block S16, referring to FIG. 7(B), the optimization module 10 designs a second experiment table for the m variables using the n' values of each of the m variables and the full factorial design. In some embodiments, the second experiment table may include n' groups of experiment data of second experiments. In statistics, the full factorial design is an experiment whose design consists of two or more factors, each with discrete possible values or "levels", and whose experimental units take on all possible combinations of these levels across all such factors.

In block S17, referring to FIG. 8, the optimization module 10 computes P EHs of each of the second experiment table using the P EH empirical formulas.

In block S18, the optimization module 10 filters a plurality of experiments, all the P EHs of which are greater than 1, from the second experiment tables, such as the experiments whose status are PASS in FIG. 9.

In block S19, the optimization module 10 computes an average EH of the P EHs of each of the filtered experiments.

In block S20, the optimization module 10 selects an experiment, which has the greatest average EH, from the filtered experiment tables, and regards the values of the m variables in the selected experiment as the optimal variables of the parameters. Referring to FIG. 10, the average EH of the experiment corresponding to the values of the variables A, B, C, and D represented by "−1", "1", "−1", and "−1", is the greatest EH, thus, in the present embodiment, the optimal values of the 4 variables A, B, C, and D of the lengths of wiring lines of 9 memories D0~D8 are respectively 2000, 650, 900, and 300.

Although certain inventive embodiments of the present disclosure have been specifically described, the present disclosure is not to be construed as being limited thereto. Various changes or modifications may be made to the present disclosure beyond departing from the scope and spirit of the present disclosure.

What is claimed is:

1. A method being executed by a processor of a computing device for optimizing parameters of electronic components on printed circuit boards (PCB)s, comprising:
    obtaining, using the computing device, m variables of one type of parameters of P electronic components on a PCB, wherein both m and P are positive integers;
    setting n values for each of the m variables, wherein n is a positive integer;
    designing a first experiment table for the m variables using the n values of each of the m variables and the Response surface methodology (RSM), the first experiment table comprising n groups of experiment data of first experiments;
    obtaining, using the computing device, P eye heights (EH)s of each of the first experiments by simulation;
    computing P EH empirical formulas according to the P EHs obtained from each of the first experiments using a predetermined model formula and mathematical regression analysis;
    resetting n' values for each of the m variables, where n' is a positive integer;
    designing a second experiment table for the m variables using the n' values of each of the m variables and the full factorial design, the first experiment table comprising n' groups of experiment data of second experiments;
    computing P EHs of each of the second experiments using the P EH empirical formulas;
    filtering a plurality of experiments from the second experiment tables, all the P EHs of which are greater than 1;
    computing an average EH of the P EHs of each of the filtered experiment tables; and
    selecting an experiment from the filtered experiment tables, which has the greatest average EH, and regarding the values of the m variables in the selected experiment as the optimal variables of the parameters.

2. The method as described in claim 1, wherein the type of the parameters of the P electronic components are lengths of wiring lines of P memories on the PCB.

3. The method as described in claim 1, wherein the predetermined model formula is: $EH=b_0+b_1*A+b_2*B+b_3*C+b_4*D+b_5*A^2+b_6*B^2+b_7*C^2+\ldots+b_m*AB+b_{m+1}*AC+\ldots+e.$ 4. The method as described in claim 1, wherein n' is greater than n.

5. A non-transitory storage medium having stored thereon instructions that, when executed by a processor, cause the processor to perform a method of optimizing parameters of electronic components on printed circuit boards (PCB)s, comprising:
    obtaining m variables of one type of parameters of P electronic components on a PCB, wherein both m and P are positive integers;
    setting n values for each of the m variables, wherein n is a positive integer;
    designing a first experiment table for the m variables using the n values of each of the m variables and the Response surface methodology (RSM), the first experiment table comprising n groups of experiment data of first experiments;

obtaining P eye heights (EH)s of each of the first experiments by simulation;

computing P EH empirical formulas according to the P EHs obtained from each of the first experiments using a predetermined model formula and mathematical regression analysis;

resetting n' values for each of the m variables, where n' is a positive integer;

designing a second experiment table for the m variables using the n' values of each of the m variables and the full factorial design, the first experiment table comprising n' groups of experiment data of second experiments;

computing P EHs of each of the second experiments using the P EH empirical formulas;

filtering a plurality of experiments from the second experiment tables, all the P EHs of which are greater than 1;

computing an average EH of the P EHs of each of the filtered experiment tables; and selecting an experiment from the filtered experiment tables, which has the greatest average EH, and regarding the values of the m variables in the selected experiment as the optimal variables of the parameters.

6. The non-transitory storage medium as described in claim 5, wherein the type of the parameters of the P electronic components are lengths of wiring lines of P memories on the PCB.

7. The non-transitory storage medium as described in claim 5, wherein the predetermined model formula is: $EH=b_0+b_1*A+b_2*B+b_3*C+b_4*D+b_5*A^2+b_6*B^2+b_7*C^2+ \ldots +b_m*AB+b_{m+1}*AC+ \ldots +e$.

8. The non-transitory storage medium as described in claim 5, wherein n' is greater than n.

* * * * *